United States Patent
Furuumi et al.

(10) Patent No.: US 6,944,707 B2
(45) Date of Patent: Sep. 13, 2005

(54) STORAGE SUBSYSTEM, INFORMATION PROCESSING SYSTEM AND METHOD OF CONTROLLING I/O INTERFACE

(75) Inventors: Noboru Furuumi, Tokyo (JP); Yoshihiro Asaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 230 days.

(21) Appl. No.: 10/618,619

(22) Filed: Jul. 15, 2003

(65) Prior Publication Data

US 2004/0015654 A1 Jan. 22, 2004

Related U.S. Application Data

(63) Continuation of application No. 09/911,384, filed on Jul. 25, 2001, now Pat. No. 6,671,767.

(30) Foreign Application Priority Data

Oct. 31, 2000 (JP) ........................................ 2000-332164

(51) Int. Cl.[7] ............................................. G06F 13/00
(52) U.S. Cl. ............................. 711/100; 711/154; 710/5
(58) Field of Search ............................ 711/4, 100, 113, 711/114, 151, 154, 158, 167–169; 710/1, 5, 6, 36, 40, 244

(56) References Cited

U.S. PATENT DOCUMENTS

| 5,526,484 A | * | 6/1996 | Casper et al. ................ 709/237 |
| 5,555,389 A | | 9/1996 | Satoh et al. ................. 711/100 |
| 5,860,022 A | | 1/1999 | Kondou et al. ................. 710/1 |
| 6,105,076 A | | 8/2000 | Beardsley et al. .............. 710/5 |
| 6,349,350 B1 | | 2/2002 | Hathorn et al. ................ 710/36 |

FOREIGN PATENT DOCUMENTS

JP 5334012 12/1993

* cited by examiner

*Primary Examiner*—Mano Padmanabhan
*Assistant Examiner*—Jasmine Song
(74) *Attorney, Agent, or Firm*—Mattingly, Stanger, Malur & Brundidge, P.C.

(57) ABSTRACT

A storage subsystem includes a disk control unit having a cache memory and disk units under control thereof is connected to a central processing unit through an interface such as FC-SB2 which the central processing unit issues an I/O request including a chain of plural commands and data asynchronously with responses from the disk control unit. The disk control unit executes commands having target data hit on the cache memory independently of the order of receipt of plural commands from the central processing unit, in parallel with the staging of target data of commands resulting in cache misses from a disk unit to the cache memory.

7 Claims, 17 Drawing Sheets

FIG. 4

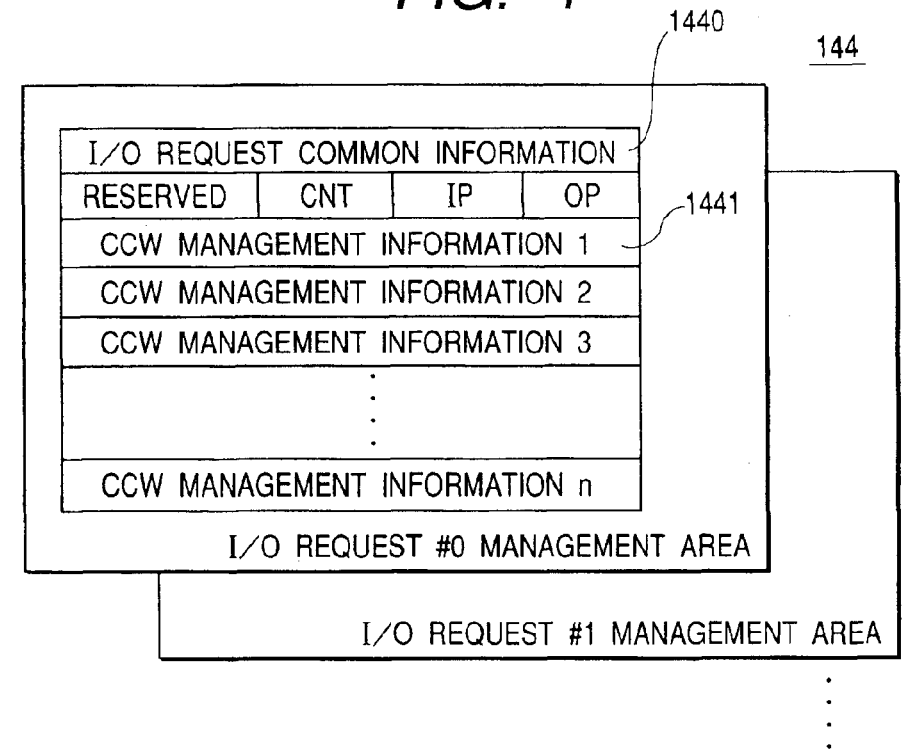

CNT : NUMBER OF ENTERED ITEMS OF CCW
    MANAGEMENT INFORMATION

IP : INDICATES THE AREA OF CCW MANAGEMENT
    INFORMATION ENTERED MOST RECENTLY

OP : INDICATES THE AREA OF CCW MANAGEMENT
    INFORMATION ENTERED EARLIEST

I/O REQUEST COMMON INFORMATION : I/O PROCESSING STATUS
                                 INFORMATION

I/O STATUS INFORMATION : STATUS RECEIVE STATUS OF ALL CCWs
                        (INDICATES WHETHER ALL STATUSES
                         WERE RECEIVED OR NOT)

CCW MANAGEMENT INFORMATION : CCW #, COMMAND CODE, CCW STATUS
                             INFORMATION, STAGING REQUEST ID #,
                             DATA STORAGE DESTINATION MAIN
                             STORAGE ADDRESS

CW STATUS INFORMATION : CCW IN PROCESS, STATUS RECEIVE WAIT

CNT : NUMBER OF ENTERED REQUESTS
IP : INDICATES THE AREA OF A REQUEST ENTERED MOST RECENTLY
OP : INDICATES THE AREA OF A REQUEST ENTERED EARLIEST

REQUEST CONTENTS : REQUEST ID (I/O REQUEST #), CCW #, TRANSFER START LBA #, TRANSFER END LBA #, NUMBER OF TRANSFERRED BYTES, NEX POINTER

STAGING ACTIVATION QUEUE TABLE

| 0 | 1 | 2 | 3 | (BYTE) |
|---|---|---|---|---|
| RESERVED | CNT | IP | OP | |
| REQUEST 1 ||||  |
| REQUEST 2 ||||  |
| REQUEST 3 ||||  |
| ⋮ ||||  |
| REQUEST n ||||  |

CNT : NUMBER OF ENTERED REQUESTS
IP : INDICATES THE AREA OF A REQUEST ENTERED MOST RECENTLY
OP : INDICATES THE AREA OF A REQUEST ENTERED EARLIEST
REQUEST CONTENTS : DRIVE #, REQUEST ID #

STAGING COMPLETION REPORT QUEUING TABLE

| 0 | 1 | 2 | 3 | (BYTE) |
|---|---|---|---|---|
| RESERVED | CNT | IP | OP | |
| COMPLETION REPORT 1 ||||  |
| COMPLETION REPORT 2 ||||  |
| COMPLETION REPORT 3 ||||  |
| ⋮ ||||  |
| COMPLETION REPORT n ||||  |

CNT : NUMBER OF ENTERED COMPLETION REPORTS
IP : INDICATES THE AREA OF A COMPLETION REPORT MOST RECENTLY
OP : INDICATES THE AREA OF A COMPLETION REPORT ENTERED EARLIEST
REQUEST CONTENTS : DRIVE #, REQUEST ID #, END STATUS

FIG. 8

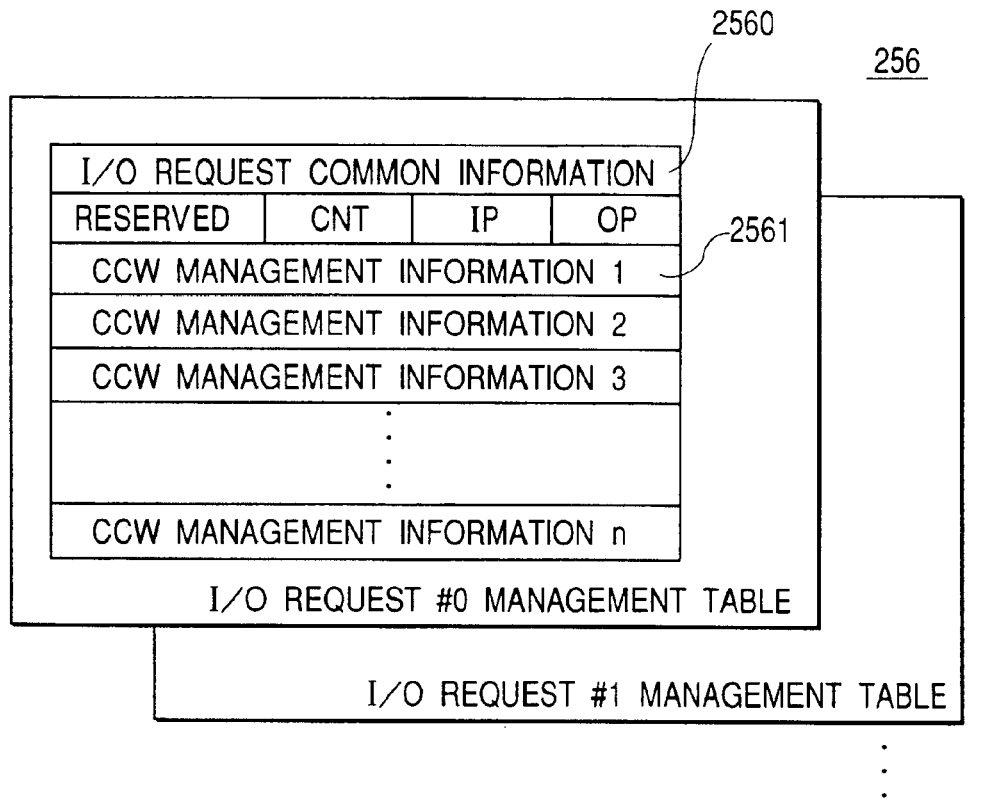

CNT: NUMBER OF ENTERED ITEMS OF CCW
    MANAGEMENT INFORMATION

IP: INDICATES THE AREA OF CCW MANAGEMENT
    INFORMATION ENTERED MOST RECENTLY

OP: INDICATES THE AREA OF CCW MANAGEMENT
    INFORMATION ENTERED EARLIEST

I/O REQUEST COMMON INFORMATION : I/O REQUEST #

CCW MANAGEMENT INFORMATION : CCW #, COMMAND CODE, CCW
                               STATUS INFORMATION, STAGING
                               REQUEST ID #,

CCW STATUS INFORMATION : CCW IN PROCESS, STATUS
                             STAGING COMPLETION WAIT

DRIVE-BASED OPERATION MANAGEMENT TABLE

| 0 | 1 | 2 | 3 | (BYTE) |
|---|---|---|---|---|
| \multicolumn{2}{c}{RESERVED} | | CURRENT AREA | 2570 |

|  | AREA #0 | AREA #1 |
|---|---|---|
| DRIVE #0 | ACCESS COUNT 1 | ACCESS COUNT 2 |
| DRIVE #1 | ACCESS COUNT 1 | ACCESS COUNT 2 |
| DRIVE #2 | ACCESS COUNT 1 | ACCESS COUNT 2 |
| ⋮ | ⋮ | ⋮ |
| DRIVE #n | ACCESS COUNT 1 | ACCESS COUNT 2 |

DRIVE-BASED STAGING REQUEST SORT TABLE

| 0 | 1 | 2 | 3 | (BYTE) |
|---|---|---|---|---|
| RESERVED | MRU | LRU | CNT | |
| ENTRY 1 | | | | |
| ENTRY 2 | | | | |
| ⋮ | | | | |
| ENTRY n | | | | |

DRIVE #0
DRIVE #1

MUR : INDICATES THE AREA OF THE NEWEST ENTRY
LRU : INDICATES THE AREA OF THE OLDEST ENTRY
CNT : NUMBER OF ENTRIES
REQUEST CONTENTS : REQUEST ID #/(I/O REQUEST #), CCW #,
TRANSFER START LBA #, TRANSFER END LBA #,
NUMBER OF TRANSFERRED BYTES

| THRESHOLD VALUE TABLE | | | | |
|---|---|---|---|---|
| 0 | 1 | 2 | 3 | (BYTE) |

- THRESHOLD VALUE OF THE NUMBER OF STAGING TARGET COMMANDS — 2590
- THRESHOLD VALUE OF COLLECTIVE STAGING LBA COUNT — 2591
- THRESHOLD VALUE OF THE NUMBER OF RECEIVED CCWs — 2592

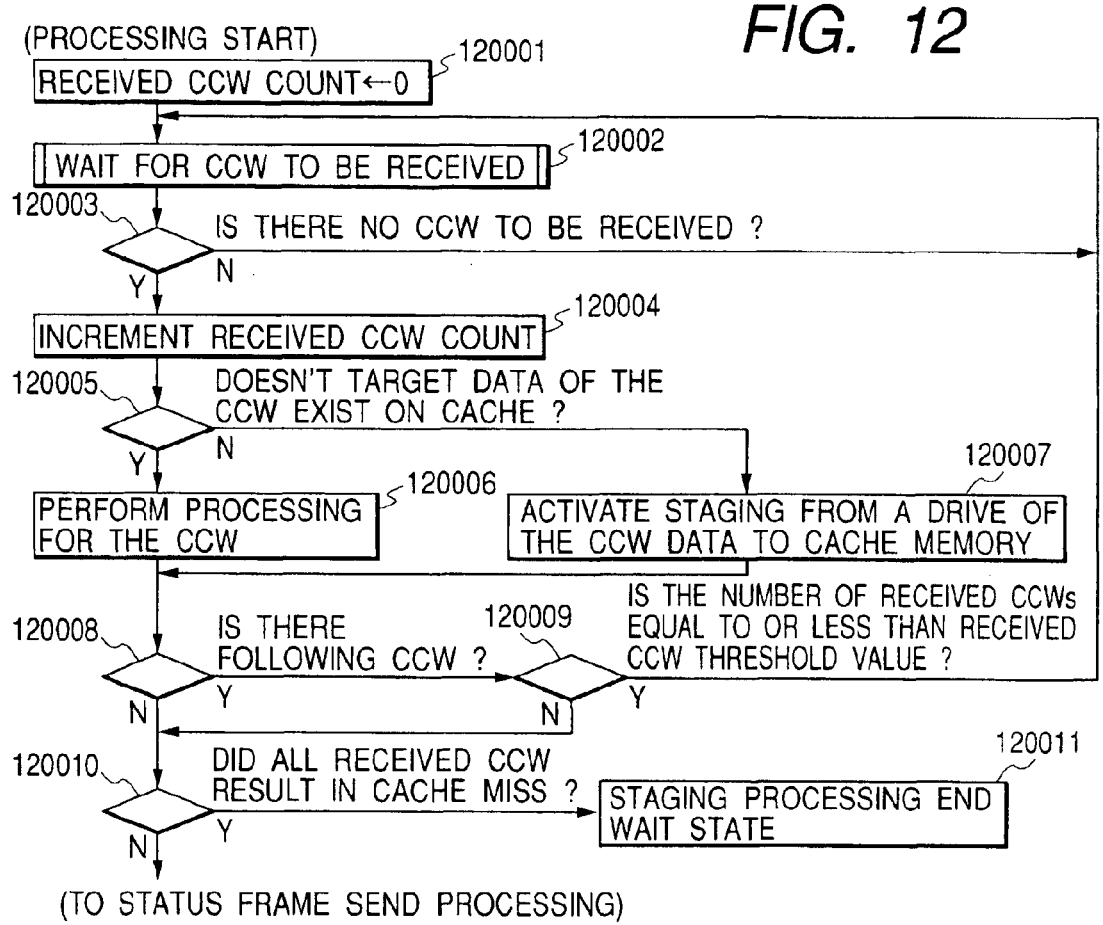
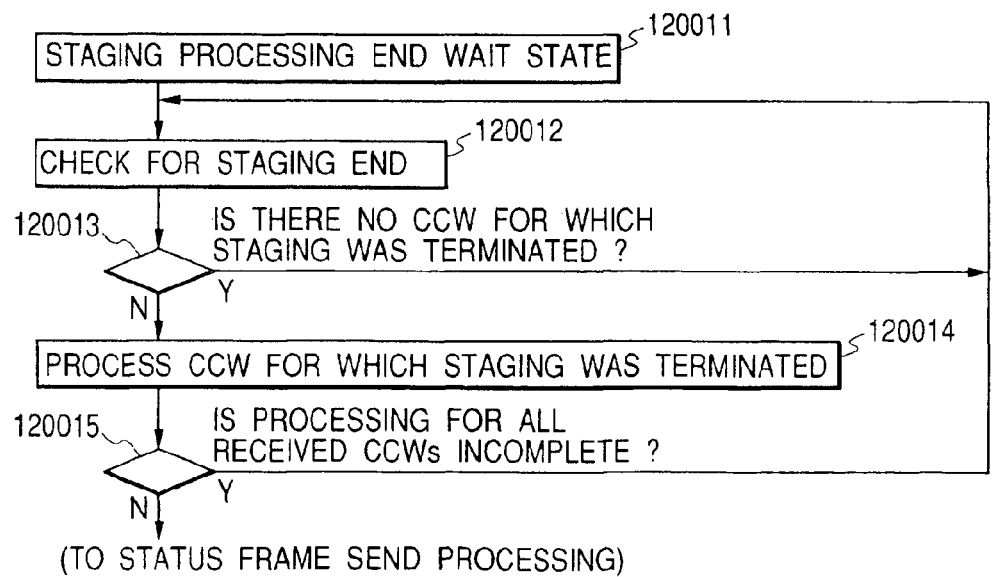
FIG. 12

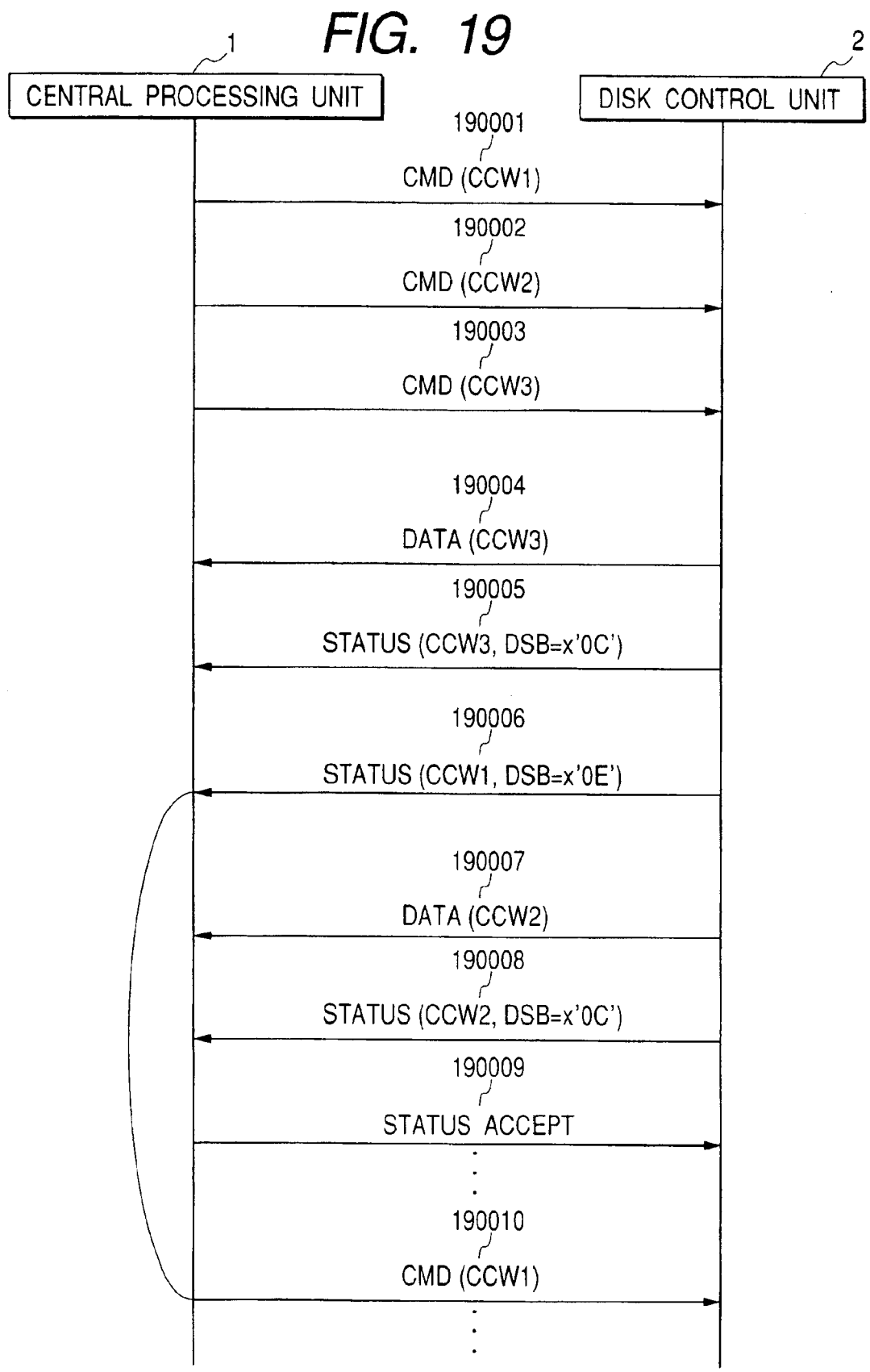

STORAGE SUBSYSTEM, INFORMATION PROCESSING SYSTEM AND METHOD OF CONTROLLING I/O INTERFACE

The present application is a continuation of application Ser. No. 09/911,384, filed Jul. 25, 2001 now U.S. Pat. No. 6,671,767, the contents of which are incorporated herein by reference.

BACKGROUND OF THE INVENTION

The present invention relates to a storage subsystem, an I/O interface control method, and an information processing system.

A large-scale information system (mainframe) used in bank online systems and the like comprises a central processing unit and a peripheral storage unit. The peripheral storage unit, which comprises a storage control unit and storage units, is called a storage subsystem. Hereinafter, a brief description will be made of an interface between the storage subsystem and the mainframe.

Between the central processing unit and the storage control unit which make up the storage subsystem oriented to the mainframe, the following information is transmitted for each I/O request: (1) command, (2) command response, (3) command response acceptance, (4) data, (5) status, and the like. These are transmitted in the form of frame to perform I/O request processing.

To execute an I/O request to a storage unit, the central processing unit creates a command group consisting of plural commands and data called a CCW chain. The central processing unit issues the first command of the command group to the storage control unit. Upon receiving the command, the storage control unit sends a command response frame to the central processing unit to indicate that a command frame has been received. In response to the command response frame, the central processing unit sends a command response acceptance frame to the storage control unit. At this moment, the central processing unit and the storage control unit both recognize that data sending and receiving has become possible, and subsequently, data sending and receiving is started between the central processing unit and the storage control unit. When data on the issued command has been sent or received, a status frame is sent from the storage control unit to the central processing unit to indicate an end status of the data transfer processing.

After receiving the status frame from the storage control unit, the central processing unit checks the contents of the status, and issues the next command if next command processing can continue. In this way, one CCW chain is successively processed while taking interlock in terms of command, command response, data transfer, and status sending for each command between the central processing unit and the storage control unit.

A CCW chain will be described in some detail. Commands constituting the CCW chain include: a Define Extent command (hereinafter referred to as a DX command) that specifies the legality of access to records, access mode, and the like; a Locate Record command (hereinafter referred to as a LOC command) that provides information for locating pertinent input-output data in a cylinder, track, and record; and read/write commands for specifying actual reading and writing.

One CCW chain consists of a chain of these plural commands. Upon receiving a LOC command, the storage control unit recognizes a cylinder, track, and record to be located from parameter data of the LOC command, and performs location processing.

The LOC command is followed by and chained to read/write commands. Processing of the read/write commands chained to the LOC command is performed for contiguous records beginning in a record located by the LOC command. A group of read/write commands thus following and chained to the LOC command is referred to as a LOC domain. A LOC domain number, that is, the number of read/write commands chained to a LOC command is specified by a parameter of the LOC command.

In one CCW chain to execute an I/O request, if the next record to be processed is not contiguous to a record processed immediately before, processing cannot be performed by an identical LOC domain and the next record to be processed must be located. In this case, the next record to be processed is located again by a LOC command. In this way, in processing for one CCW chain, when there is a read/write request for several discontinuous records, plural LOC domains will exist in the CCW chain.

Next, a description will be made of the operation of disconnecting a logical connection between the central processing unit and the storage control unit during the above described CCW chain execution.

When a read/write command is issued from the central processing unit to a storage unit under control of the storage control unit, if processing target data does not exist in a cache memory within the storage control unit, the data must be staged to the cache memory from the storage unit. In this case, the storage control unit cannot immediately execute the command. Therefore, the storage control unit sends a status to temporarily disconnect a logical connection between the central processing unit and the storage control unit to the central processing unit, and disconnects the logical connection. Thereafter, the moment the staging to the cache memory within the storage control unit is completed and preparations for I/O processing are complete, the storage control unit sends a connection interrupt request to the central processing unit to make a logical connection, and then makes a status report to indicate the resumption of I/O processing.

As described above, the storage control unit may, in some cases, disconnect a logical connection with the central processing unit because preparations for I/O processing are incomplete. Such disconnection factors include the following cases: (1) data does not exist on the cache memory within the storage control unit, so that the data is staged to the cache memory within the storage control unit from a storage unit; (2) a space cannot be allocated to the cache memory within the storage control unit, so that it is awaited that a free space occurs in the cache memory; and (3) a resource for I/O processing cannot be acquired because it is busy, so that it is awaited that the resource is released from the busy condition.

If such a disconnection operation frequently occurs during execution of an CCW chain, a total response time of I/O request processing will increase.

Next, one example of a technology for reducing an increase in response time due to cache misses will be described.

One of I/O request patterns is sequential access to records within a storage unit for processing, as typified by high-volume batch processing. In this case, a CCW chain consists of a DX command and LOC command as described previously, and plural read or write commands chained to the LOC command, and is characterized by processing contiguous records and tracks. Since processing target records are contiguous, read/write commands can be processed continuously without having to switch between LOC domains.

As described previously, if read/write target records are cache misses, since a logical disconnection between the central processing unit and the storage control unit occurs, response time will increase. In the case of this sequential access, however, even if the next command of the CCW chain is not received, since the next cylinder, track, and record to access can be predicted, by in advance staging the data on a cylinder, track, and record that will be processed to the cache memory, the chances to make disconnection between the central processing unit and the storage control unit can be reduced and response time is expected to be improved. By the way, whether the CCW chain is sequential access or not can be determined by referring to information indicating sequential access in the DX command.

On the other hand, another I/O request pattern is access to random records, as typified by access to a database. In the case of random access, since records to be accessed are distributed, before processing each record, location processing must be performed by a LOC command. Consequently, plural LOC domains exist in a CCW chain of random access. Unlike sequential access, with random access, since processing target records are not contiguous, the next record to be accessed cannot be predicted, so that data to be accessed cannot be staged in advance as it can be during sequential access. Consequently, it can be said that random access may have more chances of logical disconnection from the central processing unit due to cache misses than sequential access.

The technology of reducing an increase in response time due to cache miss has been described above. Next, a technology on an increase in throughput will be described.

In recent years, a fiber channel protocol has been in the limelight as a protocol for achieving high-volume transfer, remote data transfer, and the like. Although the fiber channel protocol is a technology having been so far mainly used in open systems, there has been recently proposed FC-SB2 (FIBRE CHANNEL Single-Byte Command Code Sets-2 Mapping Protocol), which is a protocol adhering to a physical layer (FC-PH) of fiber channel protocol as a mainframe fiber channel protocol. FC-SB2 is the result of mapping a conventional communication protocol between a mainframe and storage subsystem to FC-PH, and is currently being standardized by ANSI (American National Standard for Information Technology). The FC-SB2 has two major characteristics.

First, unlike conventional mainframe protocols, without occupying a logical connection path (hereinafter referred to as a logical path) between a central processing unit and a storage control unit during processing for one I/O request (one CCW chain), I/O requests for plural logical volumes can be executed at the same time on the identical logical path. Second, the central processing unit can issue commands and data in a pipeline fashion without taking interlock with the storage control unit. With the FC-SB2, for example, when a WR command is issued, even if a command response to the WR command is not sent from the storage control unit, the central processing unit can send data of the WR command to the storage control unit. Furthermore, even if a status frame to the command is not received, the central processing unit can issue the next command and data. Thus, the FC-SB2 protocol dictates that the central processing unit and the storage control unit respectively perform command processing asynchronously with each other.

The FC-SB2 protocol having the above described characteristics is a very effective protocol in that system throughput is not reduced at the time of connection under a high load over a long distance.

In a central processing unit and a storage subsystem connected by a protocol such as the FC-SB2 protocol that achieves reduction in interlock between the central processing unit and a storage control unit, reduction in throughput can be suppressed at the time of connection under a high load over a long distance. However, as with other protocols, the storage control unit successively processes received commands in the order they were received. Therefore, when processing target data results in a cache miss in the middle of command processing, data transfer processing between the central processing unit and the storage control unit cannot be performed, as described previously, for the duration of the staging of required data to a cache memory. This results in an increase in response time. Particularly, in random access processing as typified by database access, since a preread staging operation during sequential access cannot be performed, cache misses may increase. When a cache miss occurs in a command, since a retry operation is performed for that command and following commands, commands and data received from the central processing unit after the command in which the cache miss occurs are temporarily discarded and must be received again from the central processing unit. The re-receipt of command and data provides great overhead during connection over a long distance.

BRIEF SUMMARY OF THE INVENTION

In an information processing system comprising a storage subsystem provided with a storage control unit having plural storage units under control thereof and an internal cache memory, and a central processing unit to access the storage subsystem, wherein the central processing unit and the storage control unit are connected by an I/O interface protocol by which the central processing unit issues I/O requests consisting of a chain of plural commands and data to the storage control unit asynchronously with responses from the storage control unit, the storage subsystem of the present invention has means that decides the order of processing the plural commands and data from the central processing unit independently of the order they were received, and executes the commands.

BRIEF DESCRIPTION OF THE DRAWINGS

FIG. 4 illustrates an example of control information used in a central processing unit connected to the storage subsystem according to an embodiment of the present invention;

FIG. 6 illustrates an example of control information used in the storage control unit constituting the storage subsystem according to an embodiment of the present invention;

FIG. 7 illustrates an example of control information used in the storage control unit constituting the storage subsystem according to an embodiment of the present invention;

FIG. 8 illustrates an example of control information used in the storage control unit constituting the storage subsystem according to an embodiment of the present invention;

FIG. 9 illustrates an example of control information used in the storage control unit constituting the storage subsystem according to an embodiment of the present invention;

FIG. 10 illustrates an example of control information used in the storage control unit constituting the storage subsystem according to an embodiment of the present invention;

FIG. 11 illustrates an example of control information used in the storage control unit constituting the storage subsystem according to an embodiment of the present invention;

FIG. 12 is a flowchart showing an example of the operation of the storage control unit constituting the storage subsystem according to an embodiment of the present invention;

FIG. 19 is a sequence flowchart showing an example of the operation of an information processing system according to one embodiment of the present invention.

DETAILED DESCRIPTION OF THE PREFERRED EMBODIMENTS

Hereinafter, embodiments of the present invention will be described in detail with reference to the accompanying drawings.

Figure 2:
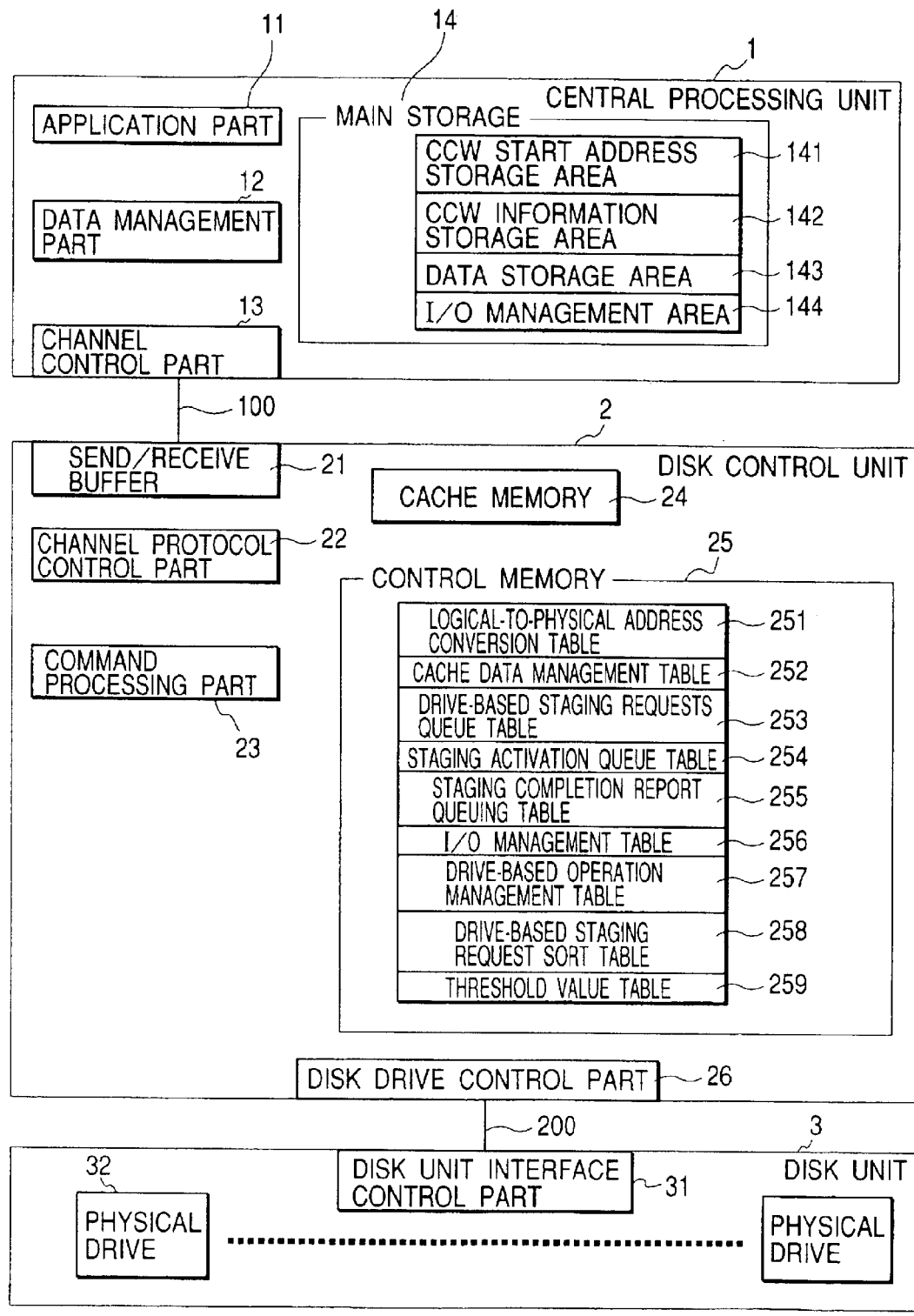
FIG. 2 is a block diagram showing an example of the configuration of a data storage system including the storage subsystem according to an embodiment of the present invention.

Before describing the present invention, the configurations of a central processing unit and a storage subsystem employing the present invention will be described using FIG. 2.

An information processing system in this embodiment comprises a central processing unit 1, a disk control unit 2, and a disk unit 3. The disk control unit 2 is connected with the central processing unit 1 by an I/O interface 100 in which, for example, FC-SB2 protocol (FIBRE CHANNEL Single-Byte Command Code Sets-2 Mapping Protocol) is installed. In the disk unit 3, plural physical drives 32 are placed to store data. The disk unit 3 is connected to the disk control unit through a drive interface 200.

First, an example of the configuration of the central processing unit 1 of this embodiment will be described. The central processing unit 1 comprises: an application part 11 that executes requests from user programs; a data management part 12 that receives input-output requests issued from the application part 11, creates CCW for input-output instructions on actual data, and manages CCW data; a main storage 14 in which CCW, data, control information, and the like are stored; and a channel control part 13 that performs control of input and output to and from the disk control unit 2.

The main storage 14 includes: a CCW information storage area 142 in which CCW information is stored; a CCW starting address storage area 141 in which the starting address of the CCW information storage area 142 is stored; a data storage area 143 in which CCW data is stored; and an I/O management area for managing I/O requests. A detailed description of them will be described later.

Next, an example of the configuration of the disk control unit 2 will be described. A send-receive buffer memory 21 is a memory for temporarily storing data sent and received to and from the central processing unit 1. A channel protocol control part 22 controls the FC-SB2 protocol described previously. A command processing part 23 decodes commands received from the central processing unit 1 and processes the commands. A cache memory 24 is a memory for temporarily storing data in data transfer between the send-receive buffer memory 21 and physical drives 32 within the disk unit 3. In the control memory 25, control information for command processing, information for controlling transfer between the physical drives 32 and the cache memory 24, and various types of information necessary to perform various types of control in embodiments described later are stored. Contents and uses of tables will be described later. A disk drive control part 26 controls an interface with the disk unit 3 connected to the disk control unit 2.

In the disk unit 3, a disk unit interface control part 31 that controls an interface with the disk control unit 2, and the plural physical drives for storing data are placed. In this embodiment, data is stored using RAID 5 configuration; this will be described using FIG. 3.

Figure 3:
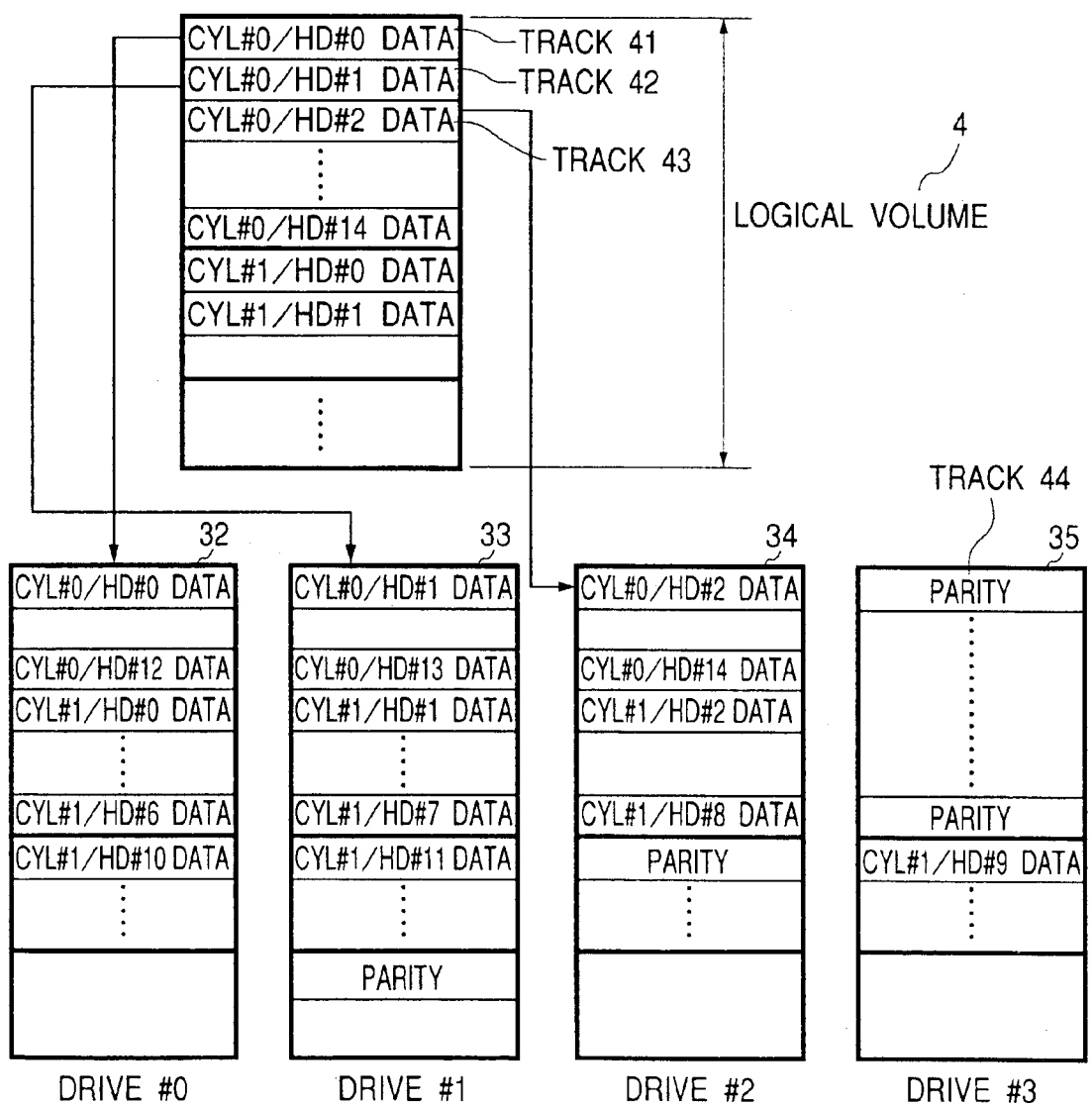
FIG. 3 illustrates an example of a data storage method in a disk unit in the storage subsystem according to an embodiment of the present invention.

Data volumes handled in the central processing unit are referred to as logical volumes; one logical volume 4 of them is shown in FIG. 3. Areas determined by combinations of cylinders (hereinafter referred to as CYL) and head (hereinafter referred to as HD) are referred to as tracks. A logical volume 4 consists of plural tracks. In this embodiment, different tracks of a logical volume are placed in plural different physical drives 32. In the case of FIG. 3, track 41 of the logical volume 4 is stored in the physical drive 32 of drive #; track 42 in a physical drive 33 of drive #1; and track 43 in a physical drive 34 of drive #2. Parity data is generated from the tracks 41 to 43, and track 44 indicating the parity data is stored in a physical drive 35 of drive #3. At this time, a horizontal row of tracks 41 to 44, which are the generation unit of parity data, is referred to as a stripe row. Since the RAID 5 configuration is employed in this embodiment, the position of a physical drive to store parity, data moves cyclically midway. In this embodiment, a physical drive to store parity data is changed every eight stripe rows. The physical drive 32 is split to fixed-length blocks (hereinafter referred to as LBA), and CCW data is split by the fixed length before being stored.

Next, a basic flow of I/O request processing will be described using FIG. 2.

In the application part 11 in the central processing unit 1, an input-output request is created for logical volume (hereinafter referred to as logical VOL) data stored in the disk unit 3, and the request is issued to the data management part 12. The data management part 12 creates a CCW chain to execute the issued input-output request. The created CCW is stored in the CCW information storage area 142 within the main storage 14, and CCW data is stored in the data storage area 143. The starting address of the CCW information storage area 142 is stored in the CCW starting address storage area 141. After creating the CCW, the data management part 12 requests the channel control part 13 to execute the CCW. Upon receipt of the CCW execution request, the channel control part 13 consults the CCW starting address storage area 141 to obtain the starting address of the CCW information storage area 142, and obtains CCW. Commands of the CCW stored in the CCW information storage area 142 are successively issued to the disk control unit 2. For WR commands, data related to an issued command, which is stored in the data storage area 143, is sent to the disk control unit 2. At this time, the data management part 12 registers I/O request common information 1440 and following information items shown in FIG. 4 in the I/O management area 144. Thereafter, CCW information required each time CCW is issued to the disk control unit 2 is registered in CCW management information 1441 of the I/O management area 144.

On the other hand, the CCW command and data received from the channel control part 13 are stored in the send-receive buffer 21 of the disk control unit 2. The channel protocol control part 22 registers and manages I/O request common information 2560 and following information items shown in FIG. 8 in the I/O management table 256. Following CCWs received in a pipeline fashion are registered and managed in CCW management information 2561 corresponding to the respective CCWs. The channel protocol control part 22 reports command receipt to the command processing part 23 each time a CCW command is received. The command processing part 23 decodes a received command, and consults a cache data management table 252 to check whether data to be processed exists on the cache memory 24. The cache data management table 252 stores information indicating whether data of specified logical VOL#/CYL#/HD#/record # exists on the cache memory 24, a cache memory address if it exists on the cache memory, data attribute, and other information. If the data exists on the cache memory (hereinafter referred to as a cache hit), the command processing part 23 performs data transfer between the cache memory 24 and the send-receive buffer memory 21. On the other hand, the channel protocol control part 22 performs data transfer between the send-receive buffer memory 21 and the channel control part 13.

Figure 5:
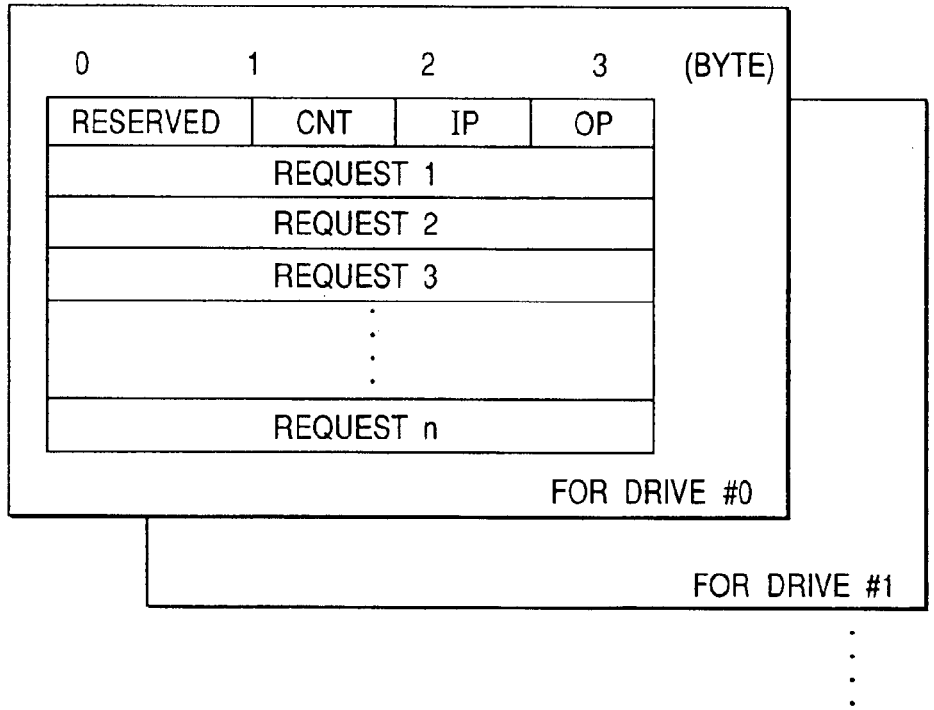
FIG. 5 illustrates an example of control information used in a storage control unit constituting the storage subsystem according to an embodiment of the present invention.

On the other hand, if the data to be processed does not exist on the cache memory 24 (hereinafter referred to as a cache miss), the data must be read into the cache memory 24 from the physical drive 32 in which the data is stored (hereinafter referred to as staging). The staging processing can operate independently for each physical drive. A physical drive number within the disk unit 3 in which the data to be processed is stored is obtained by consulting a logical-to-physical address conversion table 251. This table indicates in which LBA of a physical drive the record to be processed, determined from a logical VOL#/CYL#/HD#/record #, is stored. If a physical drive number to be subjected to staging is obtained by the logical-to-physical address conversion table 251, staging request contents are registered in a drive-based staging request queue table 253 shown in FIG. 5. The drive-based staging request queue table 253 has a FIFO structure that allows staging requests to be registered in the order requests occur. Contents registered are as shown in FIG. 5. A stage request, when registered, is assigned a unique request ID for each drive. After the stage request is registered in the drive-based staging request queue table 253, contents shown in FIG. 6 are registered in the staging activation queue table 254. "Staging completion wait" is set in CCW management information 2561 corresponding to a pertinent CCW #.

On the other hand, disk drive control part 26 periodically consults the staging activation queue table 254 of FIG. 6, and if a staging request is registered, a drive-based staging request queue table 253 is consulted from a physical drive # to be subjected to staging, staging contents are obtained, and a staging request is issued to the disk unit interface control part 31. Upon receipt of the request, the disk unit interface control part 31 transfers as much data as required from a staging start LBA number (hereinafter referred to as SLBA#) specified from the physical drive to the cache memory 24. At termination of staging processing, the disk unit interface control part 31 reports staging termination to the disk drive control part 26. Upon receipt of the report, the disk drive control part 26 enqueues the drive #/request ID having been subjected to the staging processing in a staging completion report queuing table 255.

When the command processing part 23 consults the staging completion report queuing table 255 and detects staging termination, it consults the drive-based staging request queue table 253 from drive # and request ID of the staging completion report queuing table 255 and obtains I/O request #/CCW# having been subjected to staging. The command processing part 23 consults the I/O management table 256 from obtained I/O request #/CCW#, changes "stating completion wait" of CCW management information 2561 corresponding to the CCW# to "CCW being processed", and resumes command processing. Subsequent processing is the same as processing performed at cache hit.

Hereinafter, the embodiment of the present invention will be described in more detail.

Figure 1:
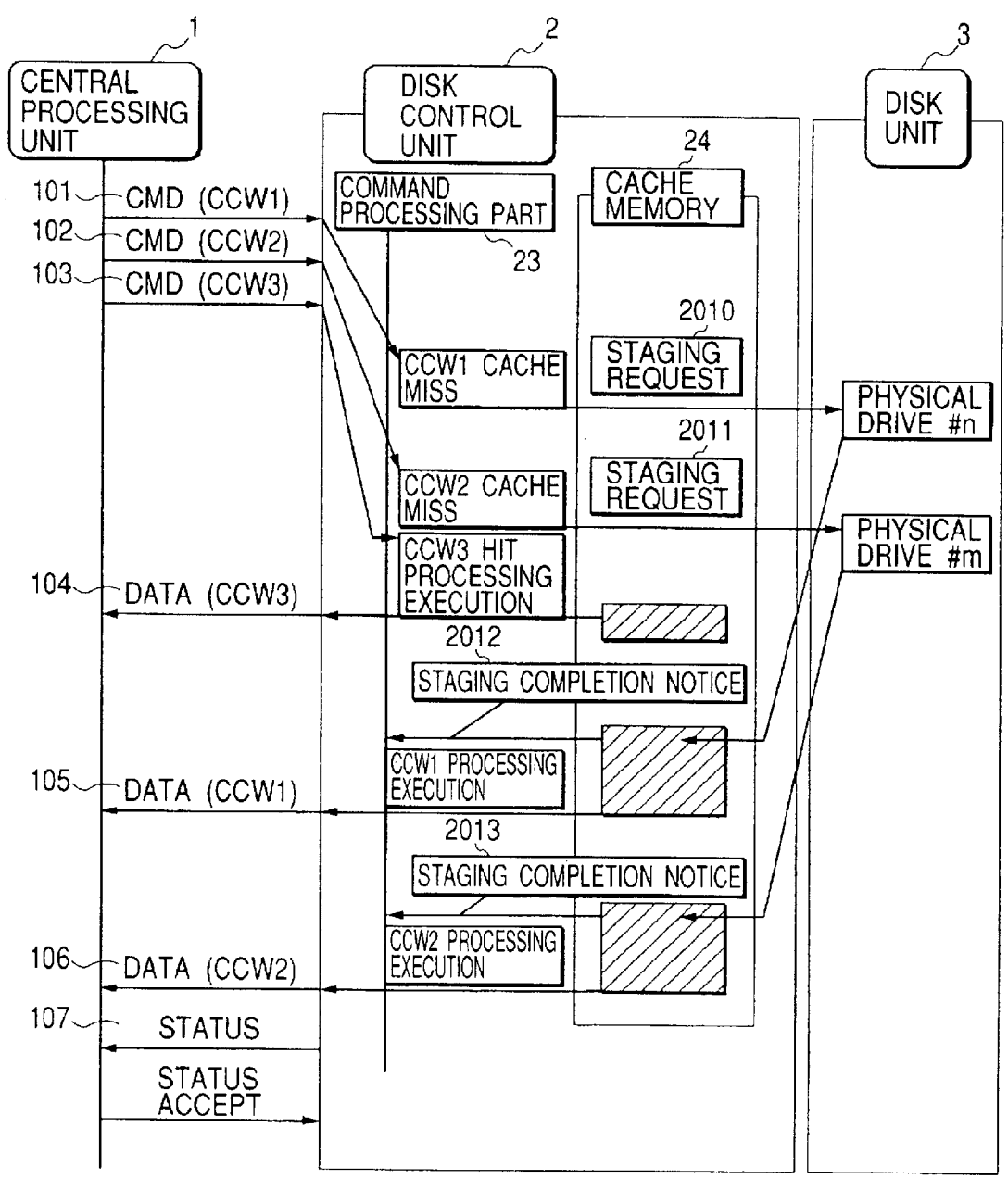
FIG. 1 is a sequence flowchart showing an example of the operation of a storage subsystem according to one embodiment of the present invention.

An example of an I/O sequence in which the present invention is adopted is shown in FIG. In FIG. 1, CMDs 101 to 103 are issued from the central processing unit 1 to the disk control unit 2, and it was recognized in the command processing part 23 that CCW1 of CMD 101 and CCW2 of CMD 102 were cache misses (cache miss and hit are judged as described previously). At this time, by the method described previously, staging processing for processing target data of CCW1 of CMD 101 is started, and then staging processing for processing target data of CCW2 of CMD 102 is also started in parallel (2010, 2011). Since following CMD 103 (CCW3) was a cache hit, the command processing part 23 processes the CCW3 and sends DATA 104, which is CCW3 data, to the central processing unit 1. After the CCW3 data has been sent, as shown in FIG. 1, since stage completion notice 2012 for a CCW1 staging request has been reported, the command processing part 23 processes CCW1 and sends DATA 105 of CCW1 to the central processing unit 1. Thereafter, since stage completion notice 2013 for a CCW2 staging request has been reported, the command processing part 23 processes CCW2 and sends DATA 106 of CCW2 to the central processing unit 1. Finally, STATUS 107 is sent.

Herein, if stage completion notice 2012 for a CCW1 staging request has not yet been reported when processing for CCW3 terminates, the disk control unit 2 may disconnect the logical connection with the central processing unit 1, restore the logical connection with the central processing unit 1 after the staging completion notice 2012 is reported, and perform processing for CCW1. Alternatively, without disconnecting the logical connection with the central processing unit 1, the report of staging completion notice 2012 may be awaited before performing processing for CCW1. In FIG. 1, although staging completion notice for CCW1 (2012) occurred earlier, if staging completion notice for CCW2 (2013) occurred earlier, processing for CCW2 may be performed earlier.

If plural CCW commands received from the central processing unit 1 were cache misses, for each of the CCWs, staging requests are put in the drive-based staging request queue table 253 and the staging activation queue table 254. Since staging processing is performed on a physical drive basis, staging does not always complete in the order staging is activated. In this case, completion reports are put in the staging completion report queuing table 255 in the order staging completed, and staging completion reports are made in the queuing order. The command processing part 23 consults the staging completion report queuing table 255 to perform command processing, with the result that command processing is performed in the order staging completed.

The above processing may be performed as described below. A threshold value of the number of received CCWs 2592 is set in a threshold value table 259 (FIG. 11), and when the number of CCWs received from the central processing unit 1 reaches the threshold value of the number of received CCWs 2592, CCWs having been received up to the point may be included in one processing target range as a CCW group so that they are controlled according to the flow shown in FIG. 12.

Specifically, in the flowchart of FIG. 12, a received CCW count is initialized to zero (step 120001); arrival of CCW from the central processing unit 1 is awaited (steps 120002 and 120003); upon receipt of CCW, the received CCW count is incremented (step 120004); a hit or miss on target data of the CCW is judged (step 120005); and for a hit, the CCW is processed (step 120006), and for a miss, the target data is staged from a drive in which the data exists to the cache memory 24 (step 120007).

Moreover, the existence of a following CCW is judged (step 120008); if there is a following CCW, it is judged whether the number of received CCWs is equal to or less than the threshold value of the number of received CCWs (step 120009); and if less than the threshold value, CCW acceptance processing in and after step 120002 is repeated.

If it is judged in step 120008 that there is no following CCW, or it is judged in step 120009 that the number of received CCWs is equal to or less than the threshold value of the number of received CCWs, it is judged whether all received CCWs were cache misses (step 120010); and if so, the system enters a staging wait state (step 120011).

If it is judged in step 120010 that all received CCWs were not cache misses, status frame send processing is performed.

In the above staging wait state (step 120011), it is monitored whether target data of CCW resulting in a cache miss has been staged (steps 12012 and 120013); if there is CCW for which staging was terminated, the CCW for which staging was terminated is processed (step 120014); it is judged whether target data of all CCWs resulting in a cache miss has been processed (step 120015); and if not so, step 120012 and following steps are repeated, and if complete, status frame send processing is performed.

Figure 13:
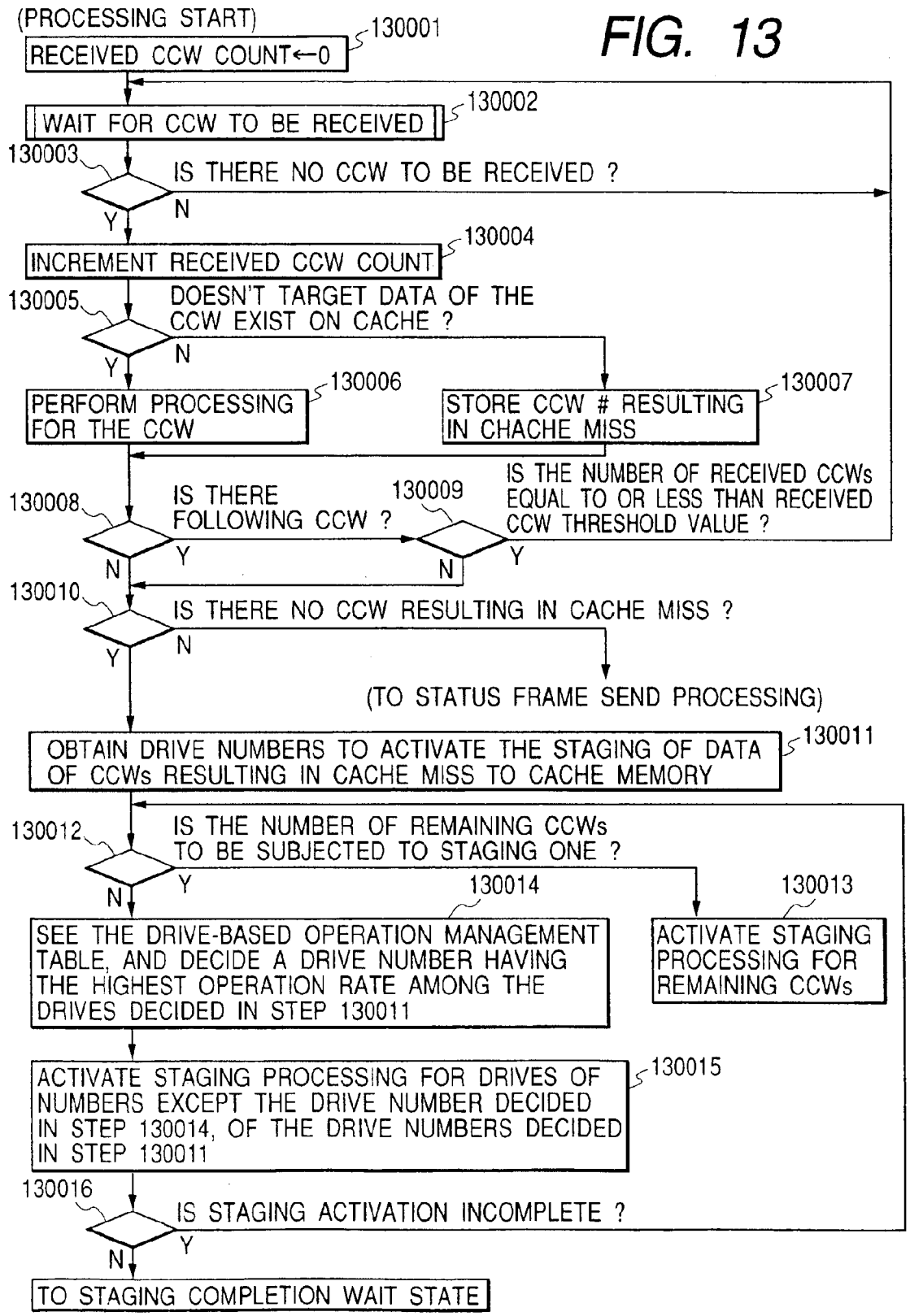
FIG. 13 is a flowchart showing an example of the operation of the storage control unit constituting the storage subsystem according to an embodiment of the present invention.

If cache misses occurred in plural CCWs received from the central processing unit 1 and it is necessary to activate staging processing, control may be performed according to a flowchart shown in FIG. 13. Specifically, the received CCW count is initialized to zero (step 130001); arrival of CCW from the central processing unit 1 is awaited (steps 130002 and 130003); upon receipt of CCW, the received CCW count is incremented (step 130004); a hit or miss on target data of the CCW is judged (step 130005); and for a hit, the CCW is processed (step 130006), and for a miss, the target data is staged from a drive in which the data exists to the cache memory 24 (step 130007).

Moreover, the existence of a following CCW is judged (step 130008); if there is a following CCW, it is judged whether the number of received CCWs is equal to or less than the threshold value of the number of received CCWs (step 130009); and if less than the threshold value, CCW acceptance processing in and after step 130002 is repeated.

If it is judged in step 130008 that there is no following CCW, or it is judged in step 130009 that the number of received CCWs is equal to or greater than the threshold value of the number of received CCWs, it is judged whether there is no CCW resulting in cache miss (step 130010); and if there is no CCW resulting in cache miss, status frame send processing is performed.

If there is CCW resulting in cache miss, drive numbers to activate the staging of data of the CCWs resulting in cache miss to cache memory are obtained (step 130011); it is judged whether the number of remaining CCWs to be subjected to staging is one (step 130012); and if so, staging processing for the remaining CCW is activated (step 130013).

If the number of remaining CCWs to be subjected to staging is not one, the drive-based operation management table 257 is consulted, and a drive number having the highest operation ratio among the drives decided in step 130011 is selected (step 130014); staging processing is activated for drives except the selected drive (step 130015); it is determined whether staging activation is incomplete (step 130016); and if staging activation is incomplete, step 130012 and following steps are repeated, and if staging activation is complete, control proceeds to staging completion wait processing.

The drive number having the highest operation ratio selected in step 130014 of FIG. 13 is obtained by consulting current area #2570 (area # or area #1) of the drive-based operation management table 257 of FIG. 9 and comparing access counts of drive numbers requiring staging in a current area (area in which statistical data is being collected). The disk unit interface control part 31 of the disk unit 3, each time an access is made to a physical area, increments by one the number of accesses to an area indicated by current area #2570. Current area #2570 of the drive-based operation management table 257 alternately indicates area #0 or area #1 after a predetermined period of time elapses.

Figure 15:
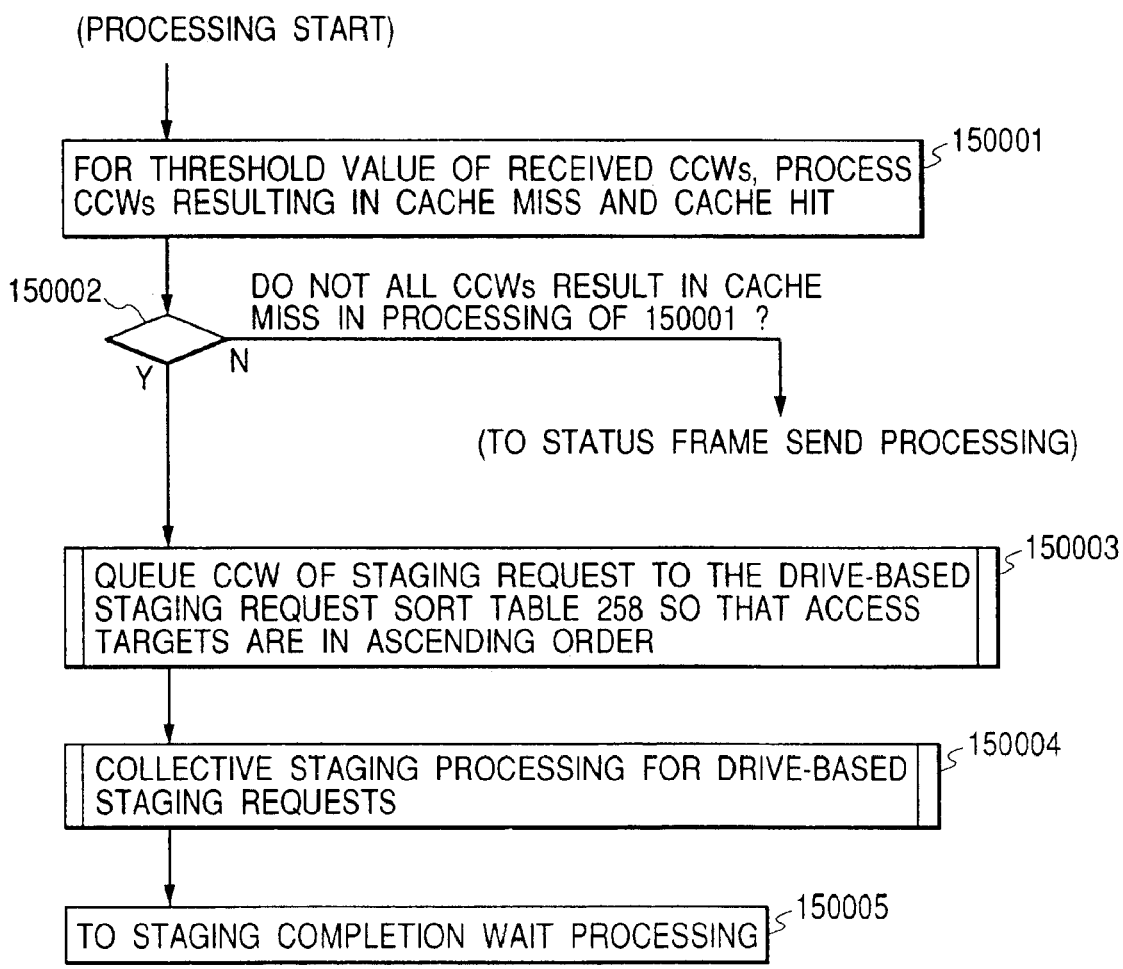
FIG. 15 is a flowchart showing an example of the operation of the storage control unit constituting the storage subsystem according to an embodiment of the present invention.
Figure 16:
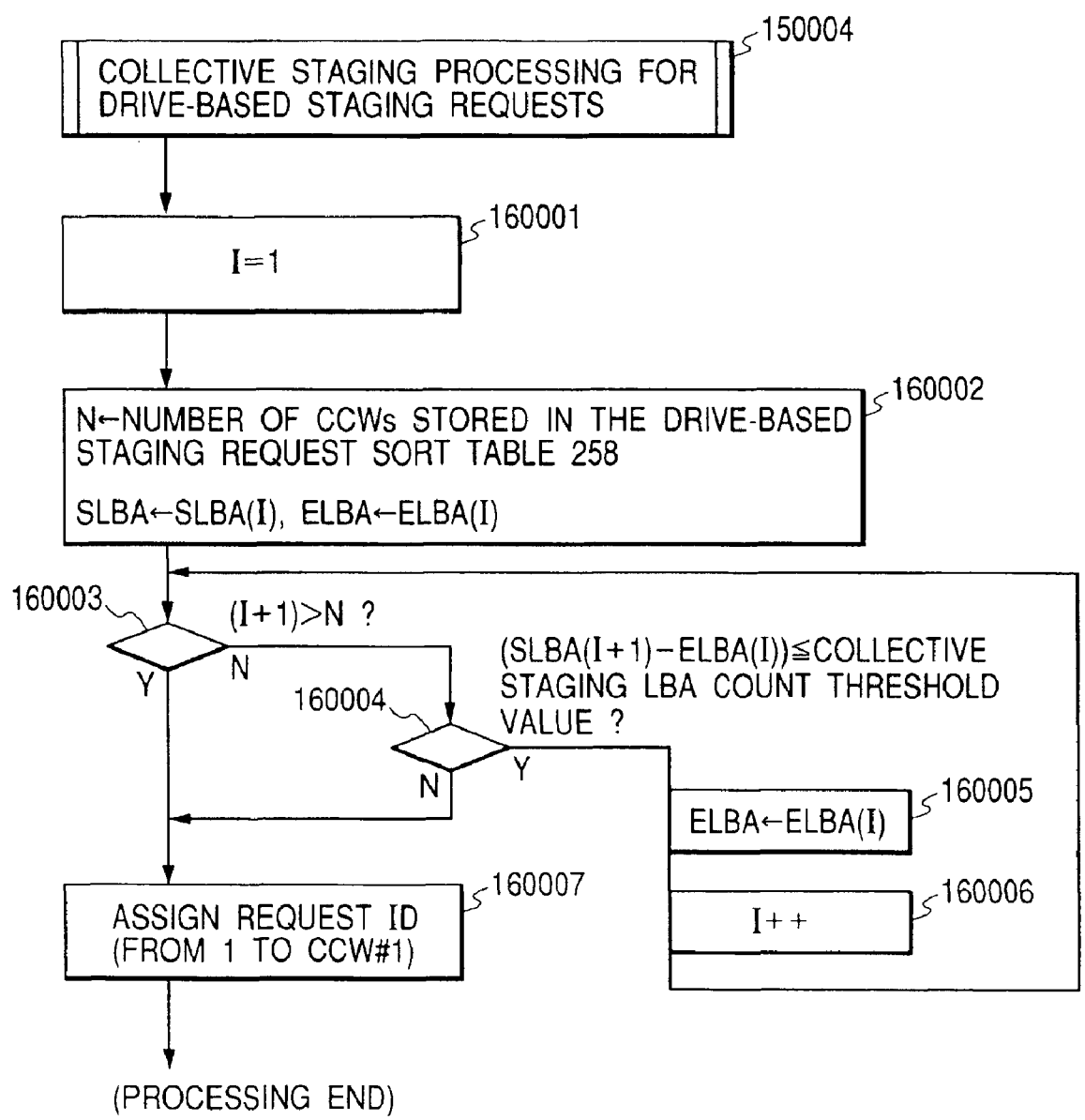
FIG. 16 is a flowchart showing an example of the operation of the storage control unit constituting the storage subsystem according to an embodiment of the present invention.

According to the flowcharts shown in FIGS. 15 and 16, staging for plural CCWs may be activated collectively as one staging request.

Specifically, in processing of FIG. 15, after the same processing as that in the above described steps 130001 to 130009 in FIG. 13 is performed, cache/miss judgment is made for as many CCWs as the threshold value of the number of received CCWs, and CCWs resulting in cache hit are processed (step 150001); it is judged whether all CCWs do not result in cache miss (step 150002); and if all CCWs do not result in cache miss, status frame send processing is performed.

If there is at least one CCW resulting in cache miss, CCW having a staging request is put in a drive-based staging request sort table 258 in ascending order of access target address (step 150003); collective staging processing for drive-based staging requests is performed (step 150004);

and control is transferred to staging completion wait processing (step 150005).

In the above described collective staging processing of step 150004, a loop variable I is initialized to 1 (step 160001); the number of CCWs stored in the drive-based staging request sort table 258 is set in a variable N, I-th staging start logical block address SLBA(I) is set in a variable SLBA, and I-th staging end logical block address ELBA(I) is set in a variable ELBA (step 160002); so long as I+1 does not exceed the number of CCWs stored in the table (step 160003), it is judged whether the difference between ELBA(I) and the next SLBA(I) is equal to or less than a collective staging LBA count threshold value (step 160004); if equal to or less than the threshold value, ELBA(I) is set in the variable ELBA (step 160005); and the loop variable I is incremented (step 160006) to repeat step 160003 and following steps, and thus discrete staging ranges are merged into one area.

In step 160003, if I+1 exceeds the number of CCWs stored in the table, or in step 160004, if the gap between adjacent staging ranges is equal to or greater than the collective staging LBA count threshold value, a staging request ID is assigned to a CCW group (one CCW in some cases) of CCW #1 to CCW #1 (step 160007).

Figure 14:
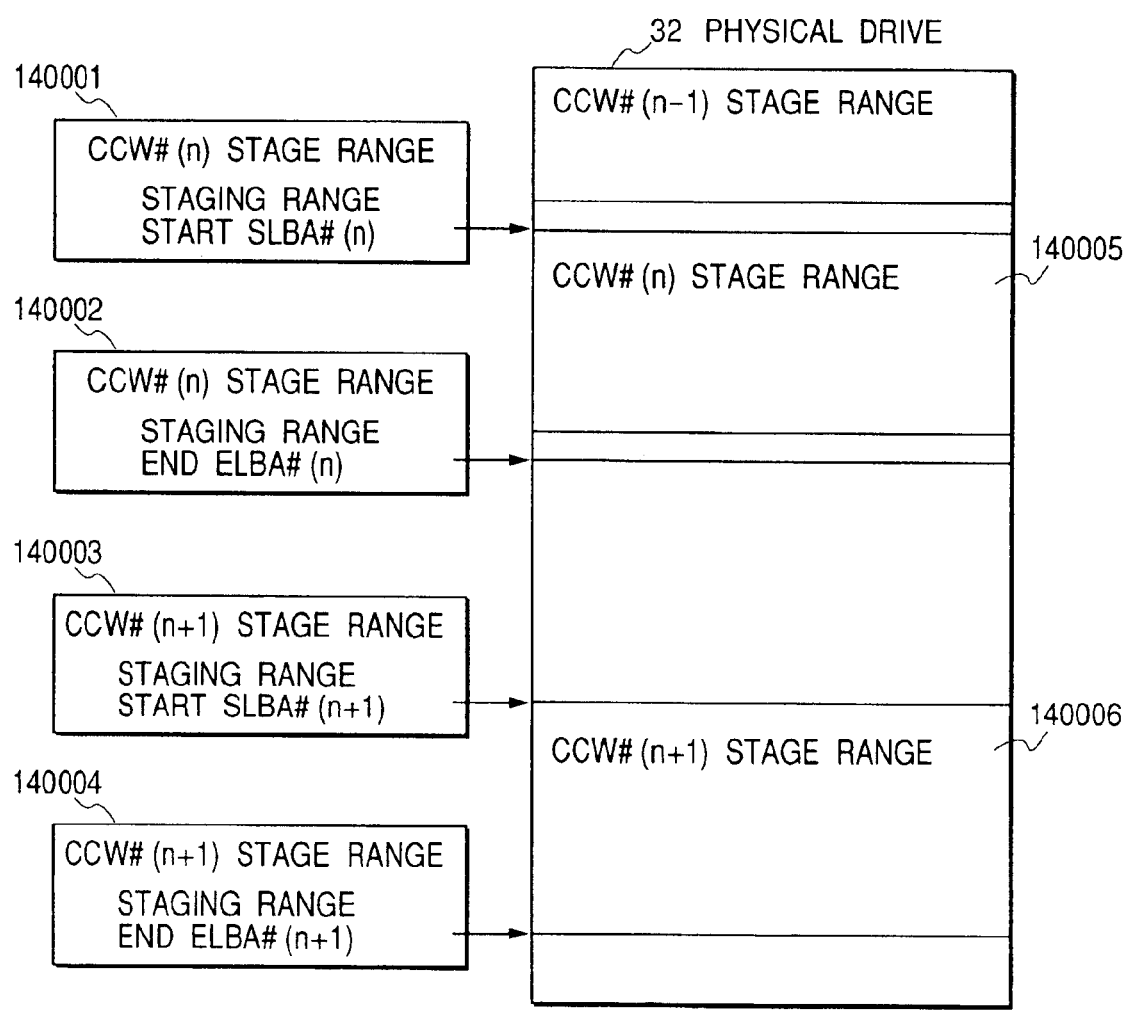
FIG. 14 illustrates an example of the operation of the storage subsystem according to an embodiment of the present invention.

In step 150003 in FIG. 15, CCW staging requests are sorted in ascending order of drive access addresses in units of drives to be subjected to staging; new staging requests are always queued in the drive-based staging request sort table 258 in ascending order of the addresses. In the flowchart of FIG. 16, plural staging requests are replaced by one staging request, using the collective staging LBA count threshold value 2591 in the threshold value table 259. This will be described in detail using FIG. 14. Suppose individual CCW staging ranges are as shown in FIG. 14. Herein, the gap (SLBA#(n+1) 140003—ELBA#(n) 140002) between CCW #n staging range 140005 and CCW #(n+1) staging range 140006, and the collective staging LBA count threshold value 2591 are compared, and if the gap between the staging ranges is smaller, both the staging ranges of CCW #n and CCW #(n+1) are merged so that the staging requests are activated as one staging request. The merged staging range begins in SLBA#(n) 140001 and ends in ELBA#(n+1) 140004. However, if the collective staging LBA count threshold value 2591 is smaller than the gap, the staging ranges are not merged.

Next, a method of controlling an I/O interface of this embodiment will be described.

In this embodiment, the disk control unit 2 does not process CCWs in the order of the CCWs received from the central processing unit 1. Accordingly, the order of sending data may differ from the order of CCWs issued from the central processing unit 1. In the central processing unit 1 of this embodiment, upon receiving data, the channel control part 13 consults the I/O management area 144 from I/O request # and CCW # contained in a data frame, obtains a data storage address of each CCW of each I/O, and stores the received CCW data in that address. The data control part 13 can also process data frames and status frames received in an order different from the occurrence order of CCWs.

Figure 17:
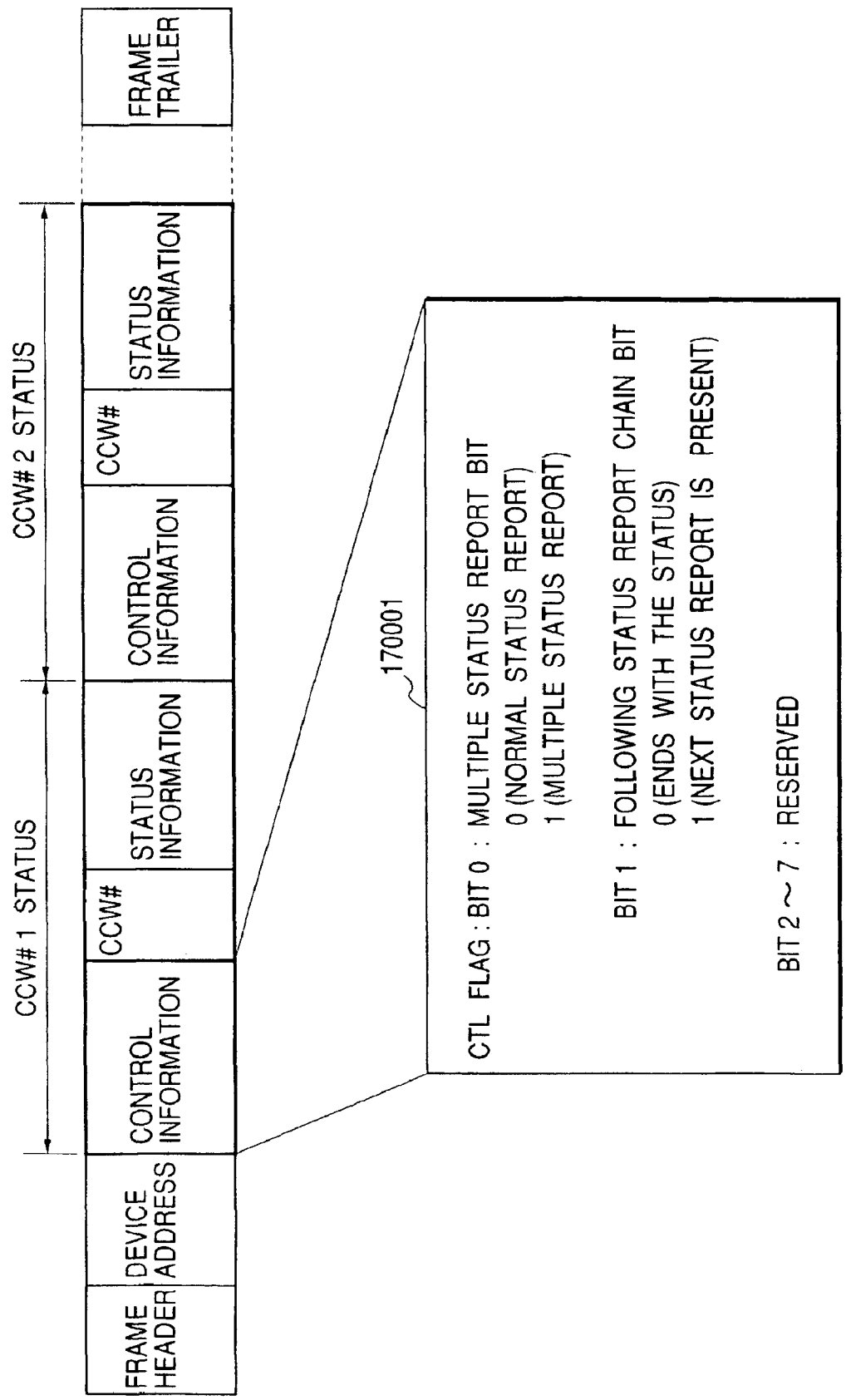
FIG. 17 illustrates an example of an I/O protocol in an I/O interface control method according to an embodiment of the present invention.

In the disk control unit 2, when an error occurs in a CCW of the CCW chain, the following processing may be performed. According to the method of controlling an I/O interface of this embodiment, as shown in FIG. 17, the contents of a status frame are changed so that status information of plural CCWs is included in one status frame. To be more specific, control information 170001 is newly included in the status frame of FIG. 17 and is provided with bits for judging whether a multiple status report function including information about plural CCWs is provided. During multiple status report, one status frame includes status information about plural CCWs, for each of which the control information 170001 is added. To indicate how many pieces of CCW status information are included, a following status report chain bit is provided within control information of each CCW; when the chain bit is ON, it is judged that a following status report is present, and when the chain bit is OFF, it is judged that the status report is the last.

Figure 18:
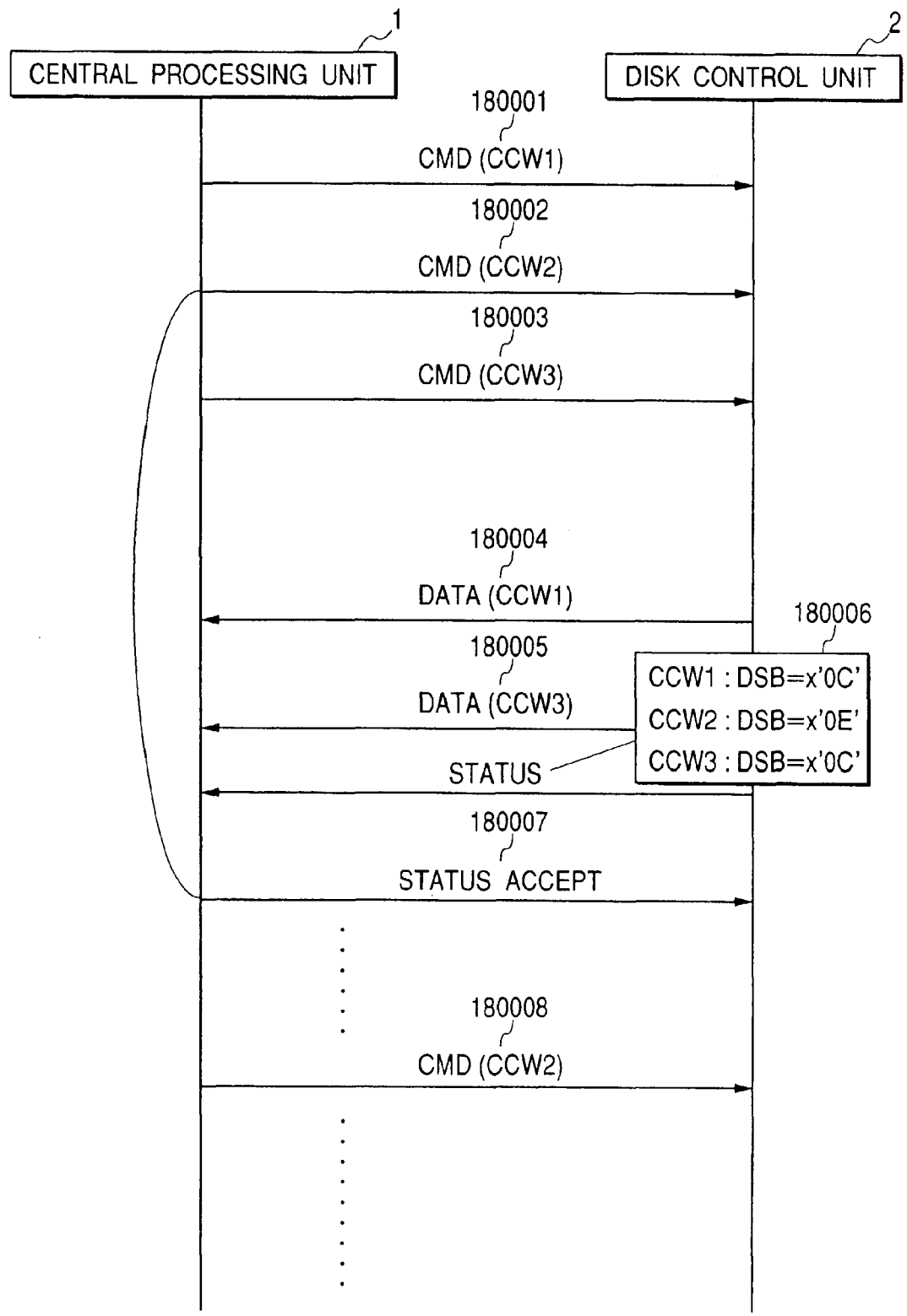
FIG. 18 is a sequence flowchart showing an example of the operation of an information processing system according to one embodiment of the present invention.

FIG. 18 shows an I/O protocol sequence of this embodiment using the status frame. In FIG. 18, although an error factor occurs in CCW2, without disconnecting the CCW chain in CCW2, CCW3 is also executed in the disk control unit 2. After all CCWs are executed, status information of CCW1 to CCW3 is collectively provided for report, using the status frame shown in FIG. 17.

Upon receipt of the status frame, the channel control part 13 stores the end statuses of CCWs of a pertinent I/O in the I/O management area 144. Thereafter, the channel control part 13 reports the end statuses of all CCWs of the I/O to the data management part 12. The data management part 12 consults the I/O management area 144, locates a CCW in which the error and retry factors occurred, and performs recovery processing as required.

Alternately, the following processing may be performed. The disk control unit 2 sends CCW data in an order decided by the disk control unit 2 as shown in FIG. 19, and reports a status frame each time processing for each CCW terminates. The status frame may not be one shown in FIG. 17. This case must be handled by the channel control part 13 that received a status frame sent for each CCW. The channel control part 13 obtains I/O request # and CCW# from a received status frame and stores the end status of the CCW in the I/O management area 144. At this time, even if a status frame indicating an error and recovery is received, the channel control part 13 does not report the end of a CCW chain to the data management part 12 if a status frame for all CCWs of the I/O is not received. After receiving a status frame for all CCWs of the I/O, the channel control part 13 interrupts the data management part 12 to report the end of the CCW chain. Subsequently, as described previously, the data management part 12 performs recovery processing for a CCW in which the error and retry factor occurred.

As has been described above, according to an information processing system using the storage subsystem and I/O interface control technology of this embodiment, in the central processing unit 1 and the storage subsystem (disk control unit 2) connected with each other through a connection interface such as FC-SB2, the disk control unit 2 (storage control unit) performs a data transfer between the central processing unit 1 and the storage subsystem for an immediately executable CCW because target data results in a cache hit, and can in parallel perform staging processing for a CCW of a cache miss. Hence, an effect obtained is, for example, that an increase in response time due to cache misses liable to occur during random access can be suppressed.

Also, the central processing unit 1 receives data and CCW end reports from the disk control unit 2 independently of the order in which a group of CCWs were issued to the disk control unit 2, locates issued CCWs corresponding to the received data and CCW end reports, and processes the data and CCW end reports as a response frame for the located CCWs. Hence, for example, the problem that execution of other CCWS resulting in cache hits is delayed because of staging processing for a part of plural CCWs resulting in cache misses can be solved, and an effect obtained is, for example, that an increase in response time due to cache misses liable to occur during random access can be suppressed.

As a result, I/O throughput between the central processing unit and in the storage subsystem consisting of the disk control unit 2, and the disk unit 3 is increased.

Although the invention by the present inventor has been described specifically based on an embodiment, it goes without saying that the present invention is not limited to the embodiment and may be changed without departing from the scope of the present invention.

For example, I/O sequence protocols for connecting the central processing unit and the storage control unit are not limited to FC-SB2 exemplified in the above embodiment, and can be widely applied to an I/O interface by which the central processing unit issues plural commands to the storage control unit asynchronously with responses from the storage control unit.

Another effect is obtained: that is, when cache misses occur during random access, an increase in response time can be prevented, and commands and data issued in a pipeline fashion such as the FC-SB2 protocol can be efficiently processed.

Another effect is obtained: that is, in a configuration in which a host apparatus and the storage subsystem are connected over an I/O interface through which the host apparatus issues I/O requests consisting of a chain of plural commands and data to the storage subsystem asynchronously with responses from the storage subsystem, throughput can be increased by reducing response time when cache misses occur during random access.

Another effect is obtained: that is, in a configuration in which a host apparatus and the storage subsystem are connected by the FC-SB2 protocol, throughput can be increased by reducing response time when cache misses occur during random access.

What is claimed is:

1. A storage subsystem comprising:

plural storage units; and a storage control unit that is connected to a central processing unit and has an internal cache memory for temporarily storing data exchanged between said central processing unit and said storage units, wherein said storage subsystem is connected to said central processing unit by an I/O interface protocol by which said central processing unit issues I/O requests including a chain of plural commands and data to said storage control unit asynchronously with responses from said storage control unit, wherein said storage control unit has means that decides an order of processing said plural commands and data from said central processing unit independently of the order they were received, and executes said commands, and wherein said plural storage units are under control of said storage control unit.

2. The storage subsystem according to claim 1, wherein said storage control unit has a means that, of plural commands received from said central processing unit, for said commands having processing target data existing on said cache memory, performs data transfer with said central processing unit, and if processing target data of said commands does not exist on said cache memory, reads said processing target data from said storage units into said cache memory in parallel with data transfer with said central processing unit.

3. The storage subsystem according to claim 1, wherein said storage control unit has means that, in the case where a RAID configuration is taken to distribute data of one logical volume across said plural storage units, merges plural commands received from said central processing unit into one command group; when processing target data of plural commands of said command group does not exist on said cache memory, in parallel activates more than once reading of processing target data of commands of said command group into said cache memory from the individual storage units in which said processing target data of said commands is stored, and in order of completion of said reading, for said commands of said command group, performs data transfer with said central processing unit in parallel with said reading.

4. A storage subsystem comprising:

plural storage units; and a storage control unit that is coupled to a central processing unit and has an internal cache memory which temporarily stores data to be exchanged among said central processing unit and said storage units, wherein:

said storage subsystem is coupled to said central processing unit in accordance with I/O interface protocol by which said central processing unit issues I/O requests having a chain of plural commands and data to said storage control unit asynchronously with responses from said storage control unit;

said storage control unit comprising deciding means configured so as to decide an order of processing said plural commands and data from said central processing unit independently of the order they were received, and executes said commands; and said plural storage units are under control of said storage control unit.

5. A method of controlling an I/O interface that is used for connection between a central processing unit and a storage control unit placing plural storage units under control thereof in which data exchanged with said central processing unit is stored, and having a cache memory for temporarily storing the data, and has a protocol by which said central processing unit issues an I/O request consisting of a chain of plural commands and data to said storage control unit asynchronously with responses from said storage control unit, comprising steps of:

performing, for commands from the central processing unit, data transfer with said central processing unit in an order independent from the order the commands were received, and reporting command end for each of the commands in said storage control unit;

receiving data and command end reports from said storage control unit in an order independent of order of issuance of commands and data from said central processing unit, locating issued commands corresponding to said received data and command end reports, and processing said data and command end reports as a response frame for said located issued commands in said central processing unit.

6. The I/O interface control method according to claim 5, further comprises steps of:

receiving data and command end reports from said storage control unit in an order independent of order of issuance of commands and data from said central processing unit, continuing the I/O request processing without discontinuing it until receiving a command end report for all commands constituting said I/O request, and performing, after receiving said command end report for all commands constituting said I/O request, recovery processing only for commands indicated as an error or a retry request in said received command end report in said central processing unit.

7. An information processing system, comprising:

a central processing unit;

a storage control unit having plural storage units under control thereof in which data exchanged with said central processing unit is stored, and having a cache memory for temporarily storing the data; and an I/O interface that is used for connection between said central processing unit and said storage control unit and has a protocol by which said central processing unit issues an I/O request consisting of a chain of plural commands and data to said storage control unit asynchronously with responses from said storage control unit, wherein said storage control unit has a means, for commands from said central processing unit, performs data transfer with said central processing unit in an order independent from order of said commands were received, and reports command end for each of said commands, wherein said central processing unit has means that receives data and command end reports from said storage control unit in an order independent of an order of issuance of commands and data from said central processing unit, locates issued commands corresponding to said received data and command end reports, and processes data and command end reports as a response frame for said located issued commands.

\* \* \* \* \*